Dec. 18, 1951    G. H. EASH    2,578,882
PHOTOELECTRIC AREA CALCULATOR
Filed Feb. 10, 1949
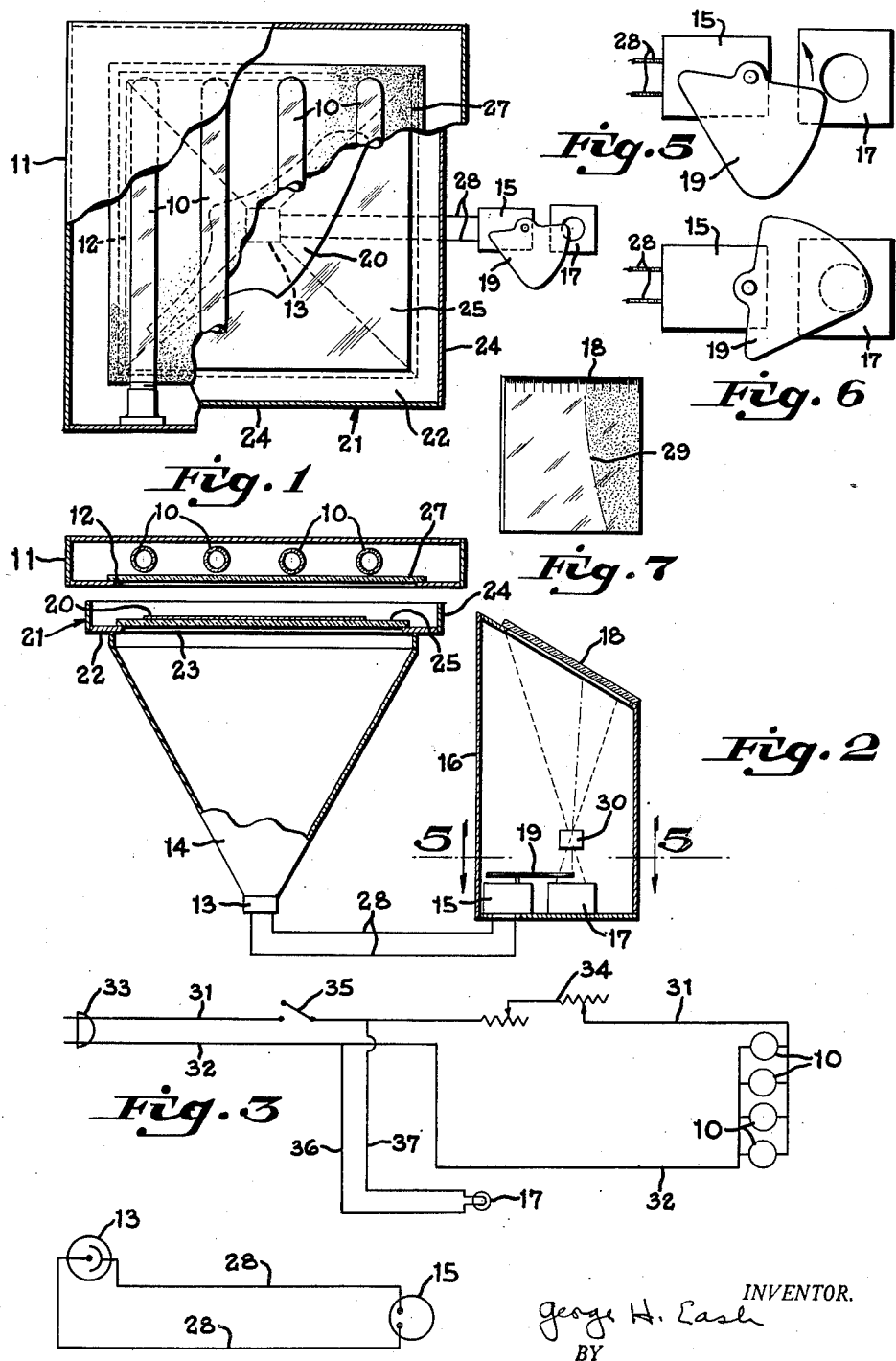

Patented Dec. 18, 1951

2,578,882

UNITED STATES PATENT OFFICE 2,578,882

PHOTOELECTRIC AREA CALCULATOR

George H. Eash, Toledo, Ohio, assignor to The Selby Shoe Company, Portsmouth, Ohio, a corporation of Ohio Application February 10, 1949, Serial No. 75,563

2 Claims. (Cl. 88—14)

This invention relates to a device for measuring areas of surfaces of irregular boundary and is particularly concerned with measuring the areas of patterns for shoe parts and the like.

The accurate calculation of the area of patterns of various shoe parts of irregular contour is a prerequisite to the determination of the time required for the "Cutter" to place the pattern on the hide in such a manner that the maximum number of complete parts is obtained from a given hide. The calculation of this area is also helpful in determining the quantity of hides that must be purchased to meet production requirements.

Ordinarily, mechanical planimeters are used to calculate these areas. In practice, it is necessary to trace the contour of the area with a scaled tracing wheel on one arm of the planimeter and then convert the reading obtained to the correct area figure by means of mathematical formulae. Hence, the use of the planimeter requires the services of a skilled technician or trained engineer and is a time-consuming, tedious procedure which often produces inaccurate results.

It is the primary object of this invention to provide a photo-electric area calculator adapted for shop or laboratory use which, when operated by an unskilled or semi-skilled workman, will quickly indicate the area of a surface of irregular boundary to a pre-eminent degree of accuracy.

This invention provides apparatus including a light source of uniform intensity which directs the beam of light to a photo-electric cell connected to area indicating means calibrated to areas of known sizes. By interposing a pattern between the light source and the photoelectric cell, the light passing from the source to the cell is reduced in proportion to the area of the pattern. Consequently, the photo-electric cell is excited in inverse proportion to the area of the pattern and the indicating means energized by the cell will give a reading directly proportional to the pattern area.

It is very important to provide a light beam which, at the place of interference of the shoe pattern, is of uniform intensity and distribution so that the pattern shadows or prevents passage of the amount of light which is directly proportional to its area. When inexpensive commercially available light sources, such as a plurality of incandescent bulbs or luminescent tubes, are used, the intensity of the light transmitted varies across the beam in proportion to the distance from the light source. Thus, the intensity of the light at points in the plane of interference which are closest to the light source will be stronger than the intensity of light at points in the plane which are remote from the light source. Thus, if a shoe pattern is placed in the beam at the point of maximum light intensity, a different area reading would be given than if it were placed in the beam at points of minimum light intensity.

Therefore, it is a further purpose of this invention to provide a light equalizer or distributor which will distribute the rays emanating from the light source over the plane area at which the pattern is to be interposed so that all portions of the plane area are exposed to rays of substantially uniform intensity.

A further objective of this invention is the provision of indicating means proportionately responsive to the excitation of the photo-electric cell whereby a shadow is cast upon an illuminated, visible scale, calibrated to know areas and said shadow intercepts said scale at a point indicating the area of the pattern. Thus, the operator may quickly and easily obtain an accurate determination of the area of the shoe pattern by simply inserting the pattern in the beam of light directed toward the photo-electric cell and quickly take the area reading from the illuminated, visible scale without having to either trace the contour of the pattern or to convert the readings obtained by mathematical calculation to the correct area figure.

Hence, this invention contemplates the interposition of a pattern between a source of illumination of fixed, uniform intensity and distribution and a photo-electric cell responsive to the intensity of the light received. The pattern diminishes or shadows the light transmitted from the source of illumination to the photoelectric cell and the cell, responding to the reduced number of light rays, excites an ammeter which causes movement of a shadow hand to break a beam of light thrown upon a calibrated area-scale. The degree of movement of the shadow hand across the beam of light impinging on the area scale is proportional to the excitation of the ammeter. Consequently, the shadow cast by the hand on the area scale is proportional to the area of the pattern interposed between the first light source and the photo-electric cell. Inasmuch as the reading of the calibrated area scale is given almost simultaneously with the interposition of the pattern in the beam of light directed to the photo-electric cell, and since the operator need only note the reading or compare the scale reading with a chart listing the correct areas for any given scale reading, the accurate determination of the area of the shoe part is completely accomplished in a matter of seconds by a semi-skilled operator. Other objects and further advantages will be disclosed in the description of the accompanying drawings in which:

Figure 1 is a top plan view of the area calculator of this invention, partially broken away to show the construction of the photo-electric cell illumination unit.

Figure 2 is a side view, partially in vertical section, of the area calibrator.

Figure 3 is a diagram of the electrical circuit for energizing the two light sources.

Figure 4 is a diagram of the circuit between the electric cell and the micro-ammeter.

Figure 5 is a top plan view of the ammeter shadow hand and scale illuminating source taken along line 5—5 of Figure 2 showing the position of the shadow hand as it begins to move to break the beam of light.

Figure 6 is a view similar to Figure 5 in which the hand is shown completely shadowing or breaking the beam of light.

Figure 7 is a view of the area scale.

A preferred embodiment of the photo-electric area calculator is shown in Figures 1 and 2 of the drawings. The device, as disclosed, comprises generally, a source of illumination consisting of luminescent tubes 10 disposed in a box 11 having a window 12 in its bottom through which the light rays emanating from the tubes pass toward a photo-electric cell 13 arranged at the end of a collecting chamber 14. The photo-electric cell is electrically connected by means of leads 28 to a micro-ammeter 15 disposed in an adjacent box 16. Also disposed within the box 16 is a second source of illumination 17, such as an incandescent bulb, which projects a beam of light on a scale 18 on a ground glass plate at the top of the box. A shadow hand 19 is connected to the ammeter and arranged so that it moves in response to the excitation of the ammeter. In the instance shown, the shadow hand 19 lies wholly within the beam shutting it off from the scale 18, when the ammeter is not energized. Upon excitation of the ammeter, the hand 19 moves out of the beam and permits light to fall on the scale 18 to a degree directly proportional to the intensity of light impinging on cell 13. Thus, when the source of light 10 is off, the shadow arm 19 is in the position shown in Figure 6 and blocks off completely the source of illumination 17 for the scale 18. As light on the cell 13 is increased, the shadow arm 19 moves out of the beam of light 17 permitting it to impinge on scale 18. With the tubes 10 turned on and no pattern interposed between the tubes and the photo-electric cell, a maximum movement of the shadow arm results and the scale 18 is fully illuminated. With a small pattern between the tubes 10 and the photo-electric cell 13, the ammeter is excited to a lesser degree, causing a proportionate movement of the shadow arm so that it does not move completely out of the beam impinging on the scale 18, thus a small shadow is cast on the scale. Larger and larger patterns result in larger and larger shadows on the scale 18; these shadows being directed proportionate to the areas of the patterns. If the scale is properly calibrated or if a calibration chart is provided which correlates given scale readings with areas of known dimensions, the operator can determine by direct reading, or by interpolation, the correct area of any irregularly shaped pattern interposed in the first light beam.

Since the amount of light obstructed by the pattern of any given area is directly dependent upon its distance from the light source and the photo-electric cell, it is necessary, in order to obtain uniform readings, to fix a standard place of interposition of the pattern between the light source and the photo-electric cell. Consequently, a pattern tray 21 is provided at the top of the chamber 14. Preferably, the tray consists of a bottom member 22 having a window 23 to permit the passage of light into the chamber and an annular flange 24 which constitutes a shield to exclude outside light from the beam emanating from the illuminating source. In the embodiment shown, the top of the shield is spaced slightly from the illuminating box to permit the introduction of the pattern 10 onto a light transmitting pane 25 for the window 23. As a practical matter, light rays entering from the outside in the narrow space between the shield and the illuminating box do not affect the reading of the instrument, since they are insufficient to increase the strength of the beam passed by the illuminating box to any substantial degree. However, if it is desired to exclude all light, the shield may extend up to the box and a door or gate may be provided for changing the patterns.

The pane 25 may be either translucent or transparent, in accordance with the light transmitting characteristics of the pattern. If the pattern is opaque, the pane may be translucent or transparent, or if the pattern is translucent, the pane may be transparent. In any event, the pane 23 should have better light transmitting qualities than the pattern.

If the light emanating from the luminescent tubes were permitted to pass unobstructed through the window in the box and fall directly on the pattern tray, the intensity of the light at various points on the tray would vary in accordance with the distance of the point on the tray from the illuminating tubes. Consequently, the area in the center of the tray or under each illuminating tube would be brightly illuminated, while the more remote regions of the tray would be less strongly illuminated. Hence, if a generally round pattern were placed on the center of the tray, it would reduce the quantity of light passing to the photo-electric cell in greater proportion than a part of a much larger area arranged to shadow the darker portions of the tray. To overcome this problem, a light equalizer 27 consisting of a pane of translucent resin thicker in the center than on the edges is provided between the tubes and the pattern tray. Naturally, if the luminescent tubes are located so that they are nearer the edges of the tray than the center, the equalizer would be formed so that it would be thicker at the edges and thinner in the center. In other words, it is proposed to construct the equalizer so that it is thickest at the points of strongest illumination and thinnest at the points of weakest illumination. Thus, the light passing from the tubes to the pattern tray is screened by the equalizer and distributed uniformly over the surface of the tray. Hence, neither the shape of the pattern nor the location of the pattern on the tray will affect the area reading, and the only factor affecting the light passing through the pane 25 will be the area of the pattern.

It will be noted that although the light impinging on the tray is equally distributed over the tray and of uniform intensity at all points on the tray, nevertheless, the light directed to the photo-electric cell from the center of the tray will be of slightly stronger intensity at the cell than the light received by the photo-electric cell which is directed from the edges of the tray. This phenomenon results because this cell is preferably located directly below the center of the tray and the distance between the photo-electric cell and the center of the tray is less than the distance from the photo-electric cell to the edges of the tray. However, it has been experimentally determined that the variation in light intensity received at the cell from the two sources is of no practical significance because the differences in the respective distances are comparatively small in an apparatus of dimensions practical for general shop and laboratory use. While the photo-electric cell is extremely sensitive to variations in light intensity, nevertheless, the difference in the distances involved is so minute that the accuracy of the instrument is not impaired. If a shadow tray is used which is extremely wide in relationship to its distance from the photo-electric cell so that the distance from the edge of the tray to the photo-electric cell is much larger proportionately than the distance from the center of the tray to the photo-electric cell, it may be necessary to compensate for the differences in the intensity of the light received from the two sources. This may be done in any convenient way. For example, it can be accomplished by constructing the equalizer so that the light cast on the tray is of progressively greater intensity from the center of the tray to the edge of the tray.

After the light passes through the pane, it is collected by the converging chamber 14 which serves also to exclude outside light from entering the beam and affecting the reading. If desired, the interior of the chamber may be brightly polished to provide a reflecting surface and, thus, magnify the degree of change in the intensity of the rays passing toward the photo-electric cell.

The photo-electric cell is preferably of the type which establishes a current in proportion variable with the quantity of light falling on it. However, any type of photo-electric cell which is responsive to light may be used in conjunction with appropriate electrical connections to the ammeter. As shown in Figures 1 and 4, the cell is connected by leads 28 in a very simple circuit to the micro-ammeter 15, which is, in turn, connected to the shadow hand 19. When the luminescent tubes 10 are energized and their light passes without interference to the photo-electric cell 13, the shadow hand is in the position shown in Figure 5 and does not interfere with the passage of light from the source 17 to the scale. However, when a pattern 20 is placed on the pattern tray so that it shadows the photo-electric cell, the cell energizes the circuit through the micro-ammeter and the shadow hand moves in the direction shown by the arrow in Figure 5 into the beam of light emanating from source 17. The shadow cast by the hand is projected upon the scale at a point indicative of the area of the pattern. The scale itself can be calibrated to give area readings or the scale can be laid off in arbitrary units which can be readily converted into the correct area figure by comparison with a chart correlating given readings with known areas. It will be observed that if the pattern completely covers the tray so that no light will pass to the photo-electric cell, the shadow hand will completely intercept the light beam projected toward the scale. The position of the shadow hand under these conditions is shown in Figure 6. Hence, if the screen is completely covered by a shadow, the operator is warned that the capacity of the apparatus is not great enough to calculate the area of the pattern.

It will be observed that the scale 18 upon which the shadow is cast is considerably larger and easier to read than the scale of a conventional ammeter. Moreover, the arrangement of the light source 17 in relation to the shadow hand and the scale is such that the shadow cast on the scale by the hand is magnified in relation to the actual size of the hand. Hence, the shadow accurately reflects small movements of the hand and extremely fine readings on the scale which would be impossible of perception from the scale of an ordinary ammeter.

In the embodiment shown in the drawings, the shadow arm is arranged to move out of the beam 17 as the photo-electric cell is excited. However, it will be readily apparent that the movement of the arm 19 may be arranged for swinging in the reversed direction, i. e., the arm could be arranged to swing farther into the beam 17 as the photo-electric cell is excited to a greater degree. In either case, the shadow cast on the scale 18 would be proportionate to the area of the pattern being measured. In both cases, the arm 19 would be returned upon de-energization by spring means similar to those used in ammeters.

In the form of shadow hand disclosed in Figures 1, 5 and 6, the leading or light intercepting edge 29 is gently curved in such a manner that the edge of the shadow cast upon the scale is almost straight and parallels the indicia lines on the scale at the point at which the shadow edge intercepts the scale. Thus, under all positions of movement of the shadow hand, the shadow line on the scale is, at its point of interception with the scale, clearly defined with response to the scale markings. If a straight edge were used, the shadow cast on the scale would in some positions, at least, angle across two or three lines of indicia, making it very difficult for the operator to ascertain which line indicated the correct reading. However, if it is desired to use a straight leading edge on the shadow hand, the scale may be calibrated on a curve and the same general effect will be achieved. To further accentuate the accuracy of the instrument, a lens 30 may be provided at a distance from the scale plate of one focal length of the lens, thus insuring a sharp shadow edge on the scale.

In Figure 3, a wiring diagram is disclosed which indicates an extremely satisfactory circuit for use in this instrument. The lamps 10 which constitute the primary illuminating source, are connected in parallel to leads 31 and 32 which run to a source of electric energy. In order to insure a uniform light source, a voltage regulator 33 is provided between the lamps and the source of electric energy. This regulator may be of any conventional type and serves to insure a constant difference in potential across the lamps 10 so that the lamps will produce a given and constant quantity of light. A variable resistance 34 is also provided in the circuit so that the current flowing through the lamps may be adjusted to standardize the lighting intensity when new lamps are inserted or old lamps begin to burn out and their light out-put decreases. A switch 35 is also provided in the circuit. This switch is normally open and is closed to energize the lamps only when it is desired to make an area calculation. If the lamps were allowed to burn constantly, the heat developed would affect the readings given by the instrument. The scale illuminating light 17 is, in the preferred embodiment, also connected by leads 36 and 37 to the main circuit. This light is also controlled by the opening and closing of switch 35.

Having described my invention, I claim:

1. In a device for measuring the planar areas of irregularly shaped patterns and the like, in which a pattern to be measured is interposed between a first source of illumination and a photo-electric cell, and the photo-electric cell thus excited in inverse proportion to the area of the pattern, area indicating means comprising a second source of illumination, a translucent screen, said screen positioned and arranged to be wholly illuminated by a beam of light from the second source of illumination, an ammeter connected electrically with said photo-electric cell, a shadow hand in operable connection with said ammeter, said shadow hand disposed intermediate said second source of illumination and said screen and adapted to swing between a position in which it completely interrupts said beam and a position in which said beam is uninterrupted by it, said hand being of such a shape that a shadow cast by it upon the screen is indicative of the amount of light from the first source of light striking the photo-electric cell and hence indicative of the planar area of the interposed pattern, and a scale associated with the screen, said scale adapted to coact with a portion of a shadow cast upon the screen to indicate in units the area of the interposed pattern.

2. In a device for measuring the planar areas of irregularly shaped patterns and the like, in which a pattern to be measured is interposed between a first source of illumination and a photo-electric cell, and the photo-electric cell thus excited in inverse proportion to the area of the pattern, area indicating means comprising a second source of illumination, a translucent screen, said screen positioned and arranged to be wholly illuminated by a beam of light from the second source of illumination, an ammeter connected electrically with said photo-electric cell, a shadow hand in operable connection with said ammeter, said shadow hand normally positioned between the second source of illumination and the screen to block completely the beam of light of the second source of illumination from the screen but adapted to move in response to excitation of the photo-electric cell toward a position in which the beam is not blocked, said hand being of such a shape that a shadow cast by it upon the screen is inversely proportional to the amount of light from the first source of illumination striking the photo-electric cell and hence directly proportional to the planar area of the interposed pattern, and a scale associated with the screen, said scale adapted to coact with a portion of a shadow cast upon the screen to indicate in units the area of the interposed pattern.

GEORGE H. EASH.

REFERENCES CITED

The following references are of record in the file of this patent:

UNITED STATES PATENTS

| Number | Name | Date |
|---|---|---|
| 1,740,130 | Von Vaas et al. | Dec. 17, 1929 |
| 1,893,421 | Latzko et al. | Jan. 3, 1933 |
| 1,935,070 | Walther | Nov. 14, 1933 |
| 1,997,712 | Bauer | Apr. 16, 1935 |
| 2,002,574 | Hart et al. | May 28, 1935 |
| 2,065,713 | Knobel et al. | Dec. 29, 1936 |
| 2,085,935 | Widenham | July 6, 1937 |
| 2,149,958 | Fox | Mar. 7, 1939 |
| 2,179,161 | Rambusch et al. | Nov. 7, 1939 |
| 2,289,272 | Ribble | July 7, 1942 |
| 2,354,767 | Nokes | Aug. 1, 1944 |